(12) United States Patent
Zoppas et al.

(10) Patent No.: US 11,794,939 B2
(45) Date of Patent: Oct. 24, 2023

(54) THERMOPLASTIC MATERIAL CONTAINER

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Dino Enrico Zanette, Godega di Sant'Urbano (IT); David Gaiotti, Susegana (IT)

(73) Assignee: S.I.P.A. SOCIETÀ INDUSTRIALIZZAZIONE PROGETTAZIONE S.P.A., Vittorio Veneto (IT)

( * ) Notice: Subject to any disclaimer, the term of this patent is extended or adjusted under 35 U.S.C. 154(b) by 204 days.

(21) Appl. No.: 17/055,426

(22) PCT Filed: May 14, 2019

(86) PCT No.: PCT/IB2019/053967
§ 371 (c)(1),
(2) Date: Nov. 13, 2020

(87) PCT Pub. No.: WO2019/220327
PCT Pub. Date: Nov. 21, 2019

(65) Prior Publication Data
US 2021/0221552 A1  Jul. 22, 2021

(30) Foreign Application Priority Data
May 14, 2018 (IT) .................. 102018000005338

(51) Int. Cl.
B65D 1/02 (2006.01)
B65D 79/00 (2006.01)

(52) U.S. Cl.
CPC ....... *B65D 1/0284* (2013.01); *B65D 79/0081* (2020.05); *B65D 2501/0036* (2013.01)

(58) Field of Classification Search
CPC ........ B65D 79/0081; B65D 2501/0036; B65D 2501/0027; B65D 1/0284; B65D 1/0261
(Continued)

(56) References Cited

U.S. PATENT DOCUMENTS 9,132,933 B2 * 9/2015 Hanan ................ B65D 1/44
2013/0213925 A1 * 8/2013 Forsthovel ............... B65D 1/42
215/370

(Continued)

FOREIGN PATENT DOCUMENTS

FR  3045571 A1  12/2015

*Primary Examiner* — James N Smalley
*Assistant Examiner* — Madison L Poos
(74) *Attorney, Agent, or Firm* — Troutman Pepper Hamilton Sanders LLP

(57) ABSTRACT

A container (1) made of thermoplastic material, defining an axis (X) and having a petaloid type bottom (2), the bottom (2) comprising: -a central area (3); -a plurality of first convex surfaces (4) towards the outside of the container, which extend from the central area (3); -a plurality of feet (5), arranged alternately with the first convex surfaces (4), and projecting outwards with respect to the first convex surfaces (4); -an annular rib (6), which is coaxial to the axis (X); wherein the first convex surfaces (4) belong to the same spherical surface having the center (C) arranged on the axis (X).

17 Claims, 9 Drawing Sheets

(58) Field of Classification Search
USPC .................................. 220/628; 215/374, 375
See application file for complete search history.

(56) References Cited

U.S. PATENT DOCUMENTS

| | | |
|---|---|---|
| 2015/0259090 A1 | 9/2015 | Dornbach |
| 2016/0144992 A1* | 5/2016 | Hermel ................ B65D 1/0284 215/375 |
| 2016/0244197 A1* | 8/2016 | Hermel ................ B65D 1/0284 |
| 2018/0362205 A1 | 12/2018 | Pierre et al. |

* cited by examiner

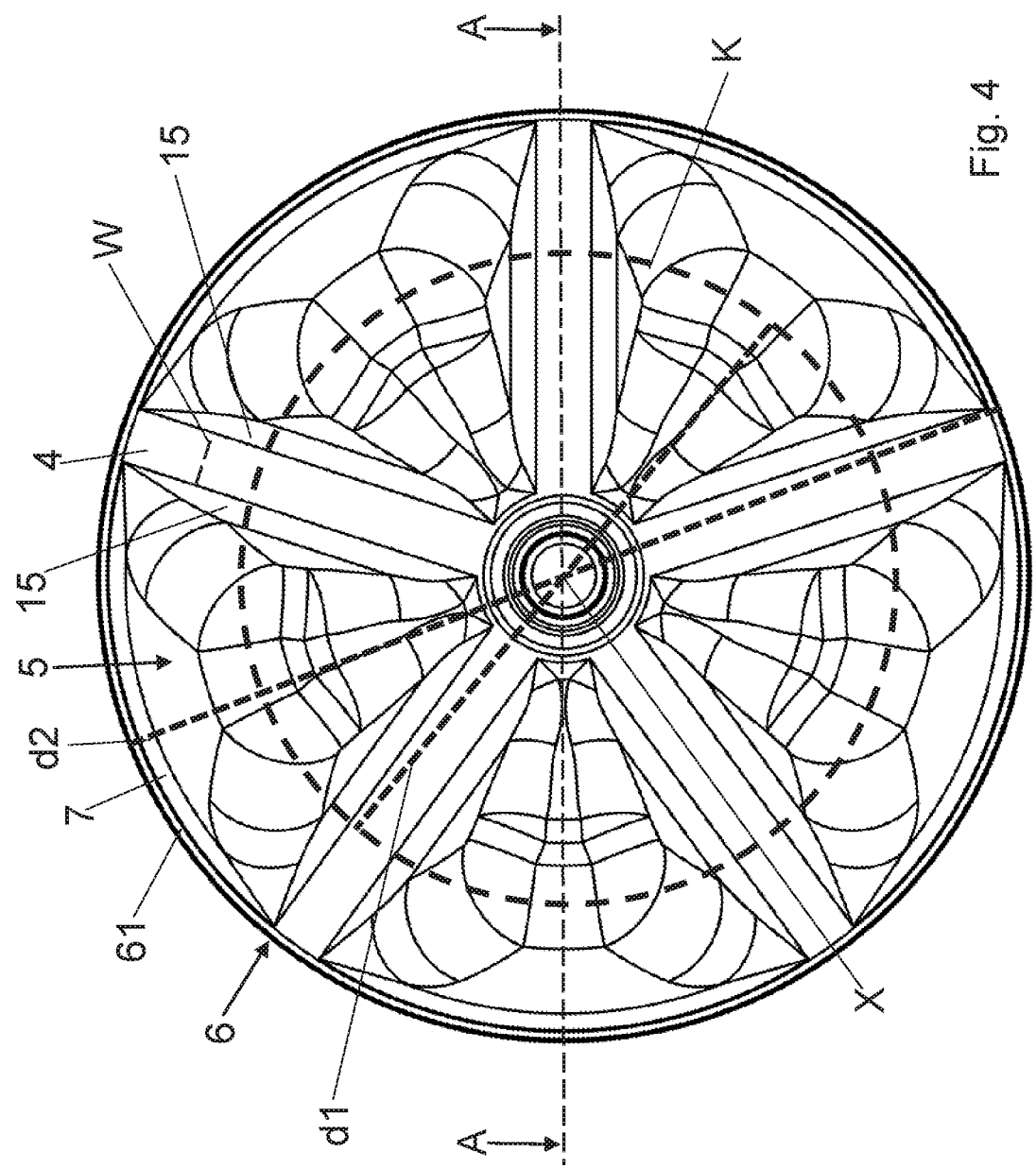

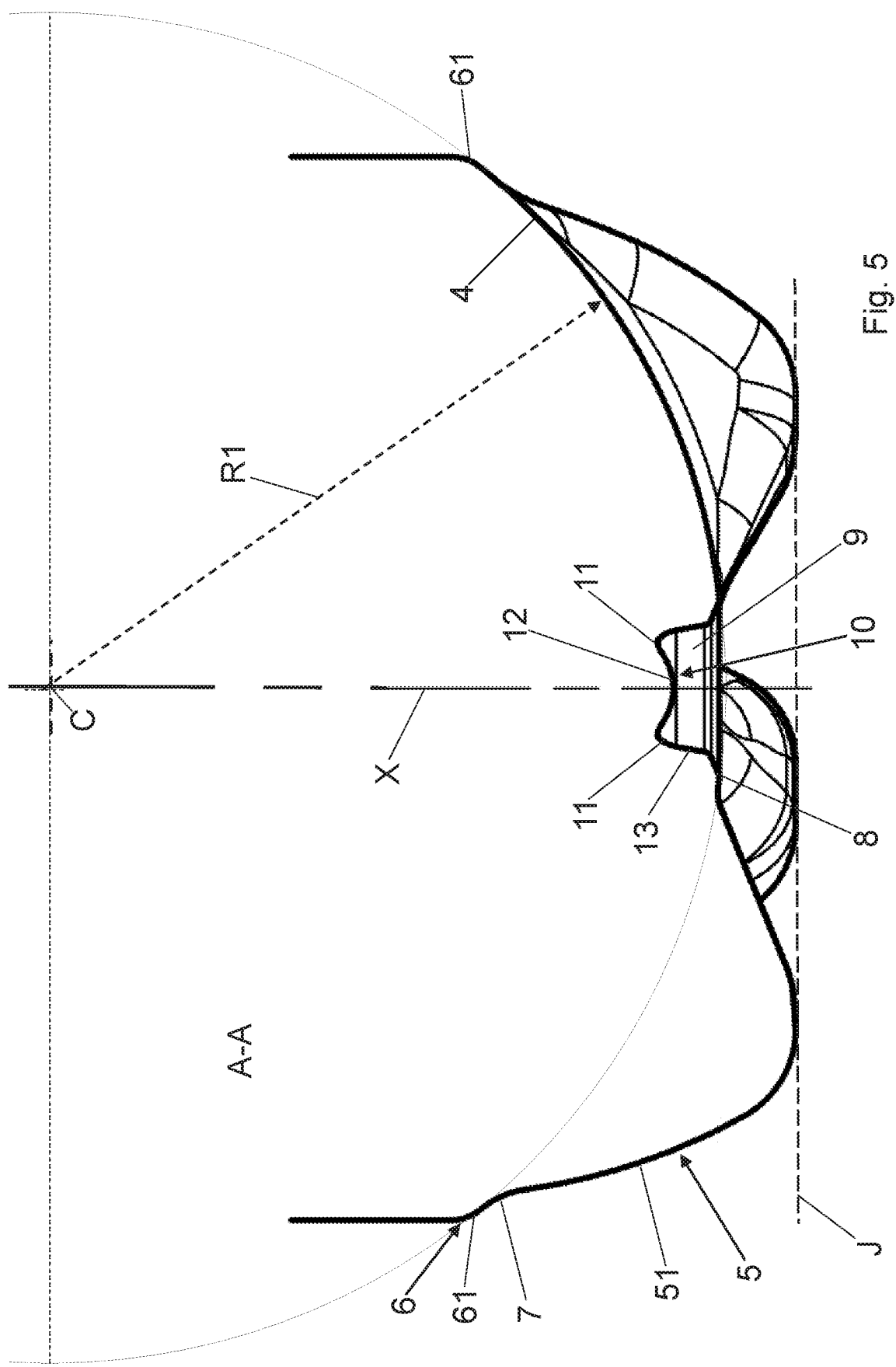

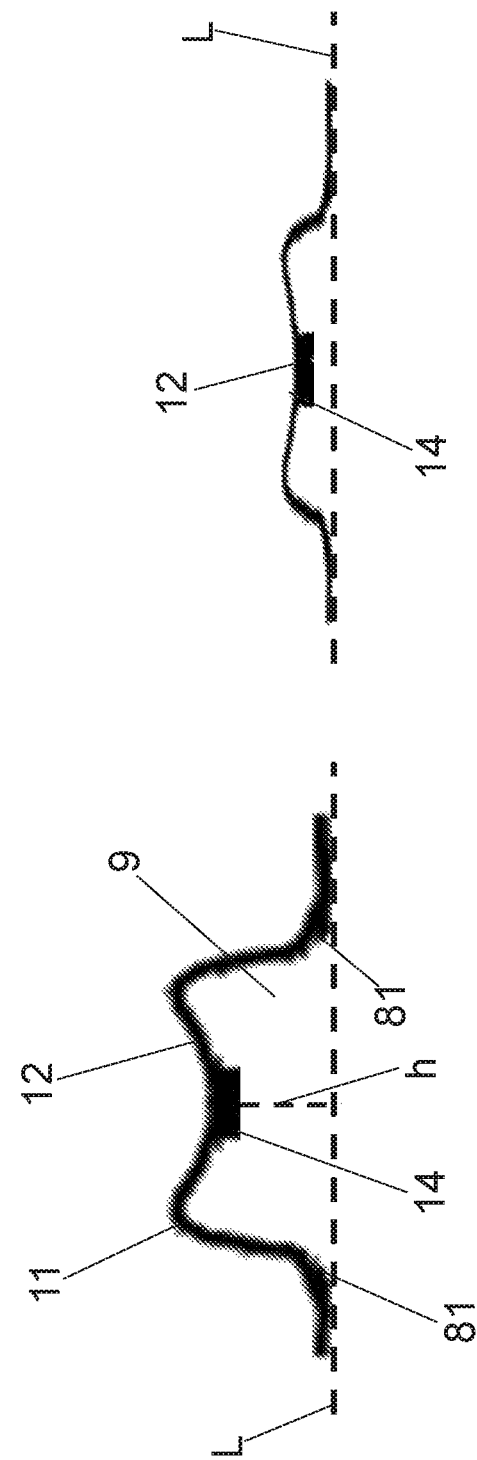

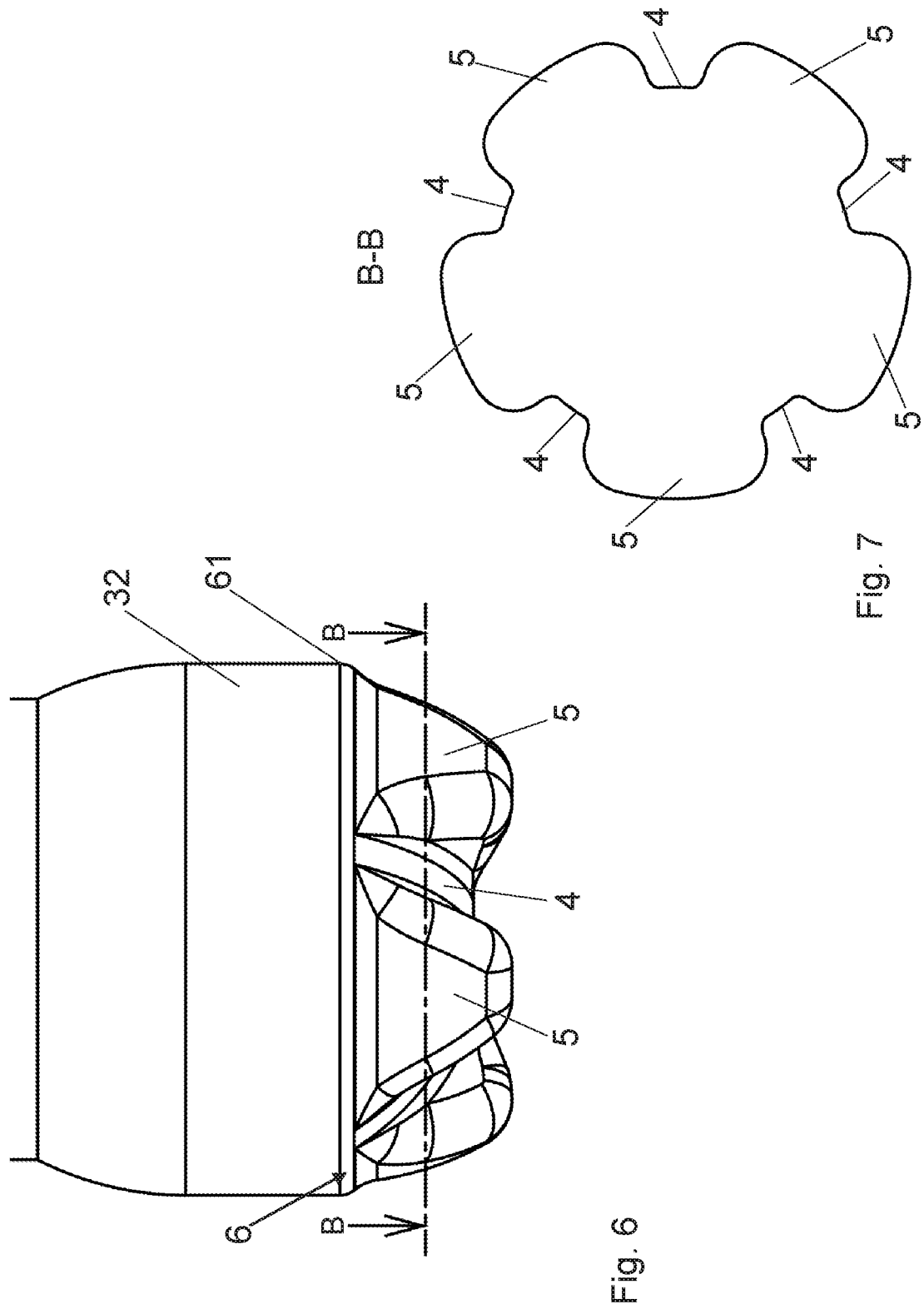

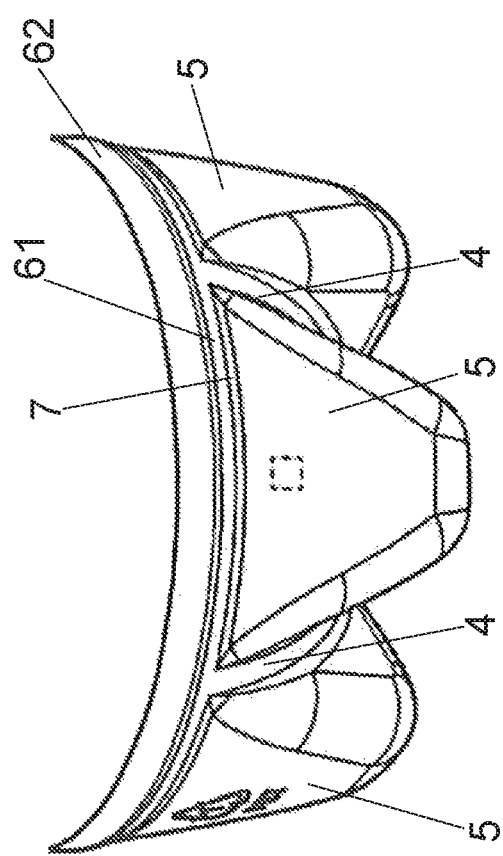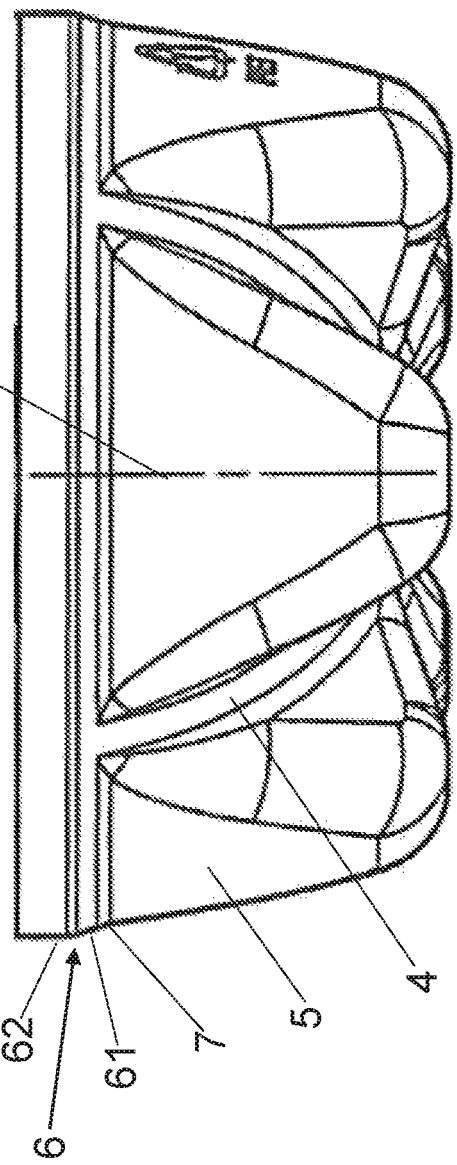

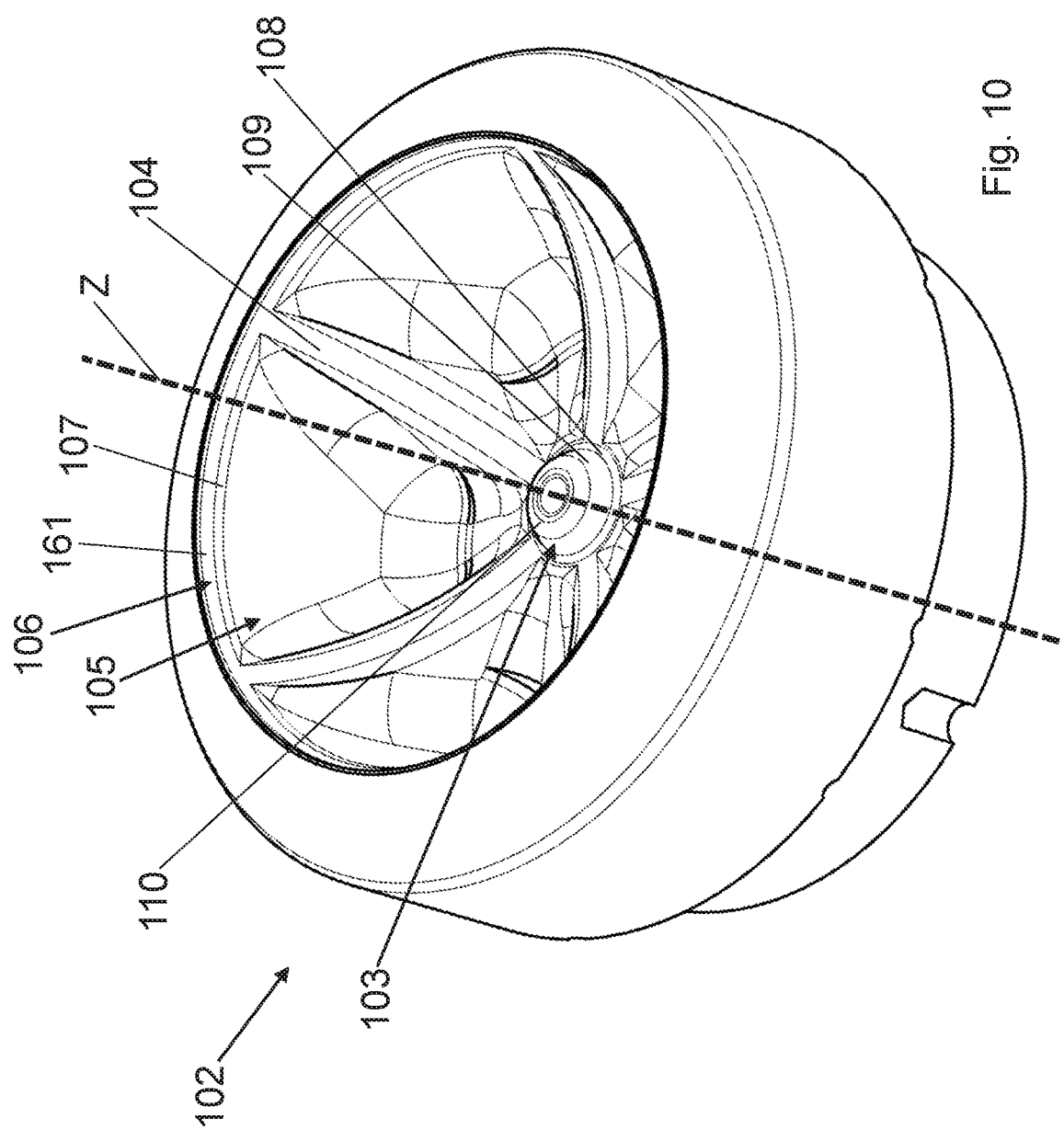

THERMOPLASTIC MATERIAL CONTAINER

CROSS REFERENCE TO RELATED APPLICATION

This application claims benefit under 35 U.S.C. § 371 to international application No. PCT/IB2019/053967 filed on May 14, 2019, which claims priority to Italian application No. 102018000005338 filed May 14, 2018, the contents of which are incorporated by reference in their entireties.

FIELD OF THE INVENTION

The present invention relates to containers, in particular bottles, made of thermoplastic material such as PET. In more detail, the invention relates to containers for carbonated drinks, having a bottom designed for containing this type of liquids. The invention also relates to molds for manufacturing such containers.

BACKGROUND ART

Bottles typically comprise a neck, which delimits an opening, a body and a bottom, which forms a support base so that the bottle can stand on a surface in a vertical position.

Bottles intended to contain carbonated drinks are subjected to particular mechanical stresses due to the pressure of the gas. These bottles are generally designed with a bottom which, in the terminology of the relevant field, is known as petaloid bottom.

A petaloid bottom comprises feet, known as petals, separated by areas referred to as valleys. The feet protrude with respect to the valleys and therefore form a support base. The valleys are used to absorb stresses.

A known issue of PET bottles is the amount of material used, which is desirable to be reduced as much as possible. It is therefore important that the distribution of the material which forms the bottle is optimal.

Furthermore, although the petaloid shape allows stiffening the bottom, it introduces difficulties in the process of manufacturing the bottles. Indeed, the bottles are produced from preforms which are arranged in a mold.

The preforms, conveniently heated inside the mold, undergo a process of expansion to obtain the final container, e.g. a bottle.

When the mold must impart a petaloid shape, the blown material firstly goes into contact with the walls which form the valleys and then with the walls which form the petals. However, the contact with the walls which form the valleys negatively affects the flow of the material towards the walls which form the petals. Therefore, the thickness of the walls of the feet may be too thin and the strength of the bottom is reduced.

Such issues must be coordinated with the requirement that bottles with petaloid bottom for carbonated drinks must have, in particular resistance to mechanical and thermal stresses, and the stability of the bottle when standing on a surface, as well as with mass manufacturing needs, which require low pressures and short permanence time in the mold.

The petaloid bottoms must therefore be conveniently designed, but achieving an optimal petaloid bottom is not trivial.

SUMMARY OF THE INVENTION

It is an object of the present invention to provide a thermoplastic material container having a petaloid bottom which can be manufactured with less material than the prior art, but which is adequately resistant to mechanical and thermal stresses.

It is another object of the present invention to provide such a container which can be manufactured by molding in an easier manner than the prior art.

It is another object of the present invention to provide such a container which can be manufactured in a wide range of formats.

The present invention achieves at least one of such objects and other objects which will become apparent from the present description, by means of a thermoplastic material container defining an axis X and having a petaloid type bottom; the bottom comprising a central area; a plurality of first convex surfaces towards the outside of the container, which extend from the central area; a plurality of feet, arranged alternately with the first convex surfaces, and projecting outwards with respect to the first convex surfaces; an annular rib, which is coaxial to the axis X;

wherein the first convex surfaces belong to the same spherical surface having the center arranged on the axis X.

The container, which is preferably a bottle, is designed to contain carbonated drinks, such as soft drinks (CSDs), beer, carbonated water and carbonated energy drinks, for example.

Advantageously, the bottom of the container may be manufactured with less material than the prior art (e.g. about 30% less), thus obtaining an overall weight reduction of the container. At the same time, characteristics suited for containing carbonated liquids, even at relatively high temperatures, higher than the ambient temperature, are ensured.

Advantageously, the bottom is particularly resistant to deformation. Indeed, the bottom can adequately withstand both the radial expansion and the downward extroversion.

Advantageously, since the valleys (first convex surfaces) belong to the same spherical surface having the center located on axis X, the resistance of the bottom to the internal pressure due to the gas, typically $CO_2$, present in the liquid, is improved. In particular, the force distribution is better.

Advantageously, the improved strength of the bottom is also found at relatively high temperatures.

According to an advantageous aspect, the valleys can optionally be adjacent to the annular rib, thus obtaining a further improved strength of the bottom.

According to an advantageous aspect, the bottom optionally comprises a push-up, i.e. a recess of the central area. This further improves the strength of the bottom. According to an advantageous aspect, the standing diameter of the bottom is appropriately selected so as to improve the strength of the bottom and reduce the manufacturing defects of the container, because a better distribution of the material is obtained. In particular, the overstretching which typically results in undesired white defects on the material or undesired thinning of the walls of the petals are greatly reduced or eliminated. An adequate stability of the container is still ensured, in particular for handling the containers on conveyor belts. According to an aspect, the invention also comprises a mold for manufacturing such a container, in particular by molding a preform, for example but not exclusively, by blow molding or stretch-blow molding a preform.

Further features and advantages of the present invention will become more apparent in light of the detailed description of exemplary, but not exclusive, embodiments.

The dependent claims describe particular embodiments of the invention.

BRIEF DESCRIPTION OF THE DRAWINGS

The description of the invention refers to the accompanying drawings, which are provided by way of non-limiting example, in which:

FIG. 4 shows a bottom plan view of the bottom in FIG. 2;

FIG. 5 shows the section A-A in FIG. 4;

FIG. 5A diagrammatically shows a first configuration of part of the container according to the invention;

FIG. 5B diagrammatically shows a second configuration of part of the container in FIG. 5A;

FIG. 6 shows part of the contain in FIG. 1;

FIG. 7 shows the section B-B in FIG. 6;

FIG. 8 shows a perspective view of a variant of a bottom of the container according to the invention;

FIG. 9 shows a side view of the bottom in FIG. 8;

FIG. 10 shows a perspective view of a mold according to the invention.

The same elements or functionally equivalent elements have the same reference numerals.

DESCRIPTION OF EXEMPLARY EMBODIMENTS OF THE INVENTION

Figure 1:
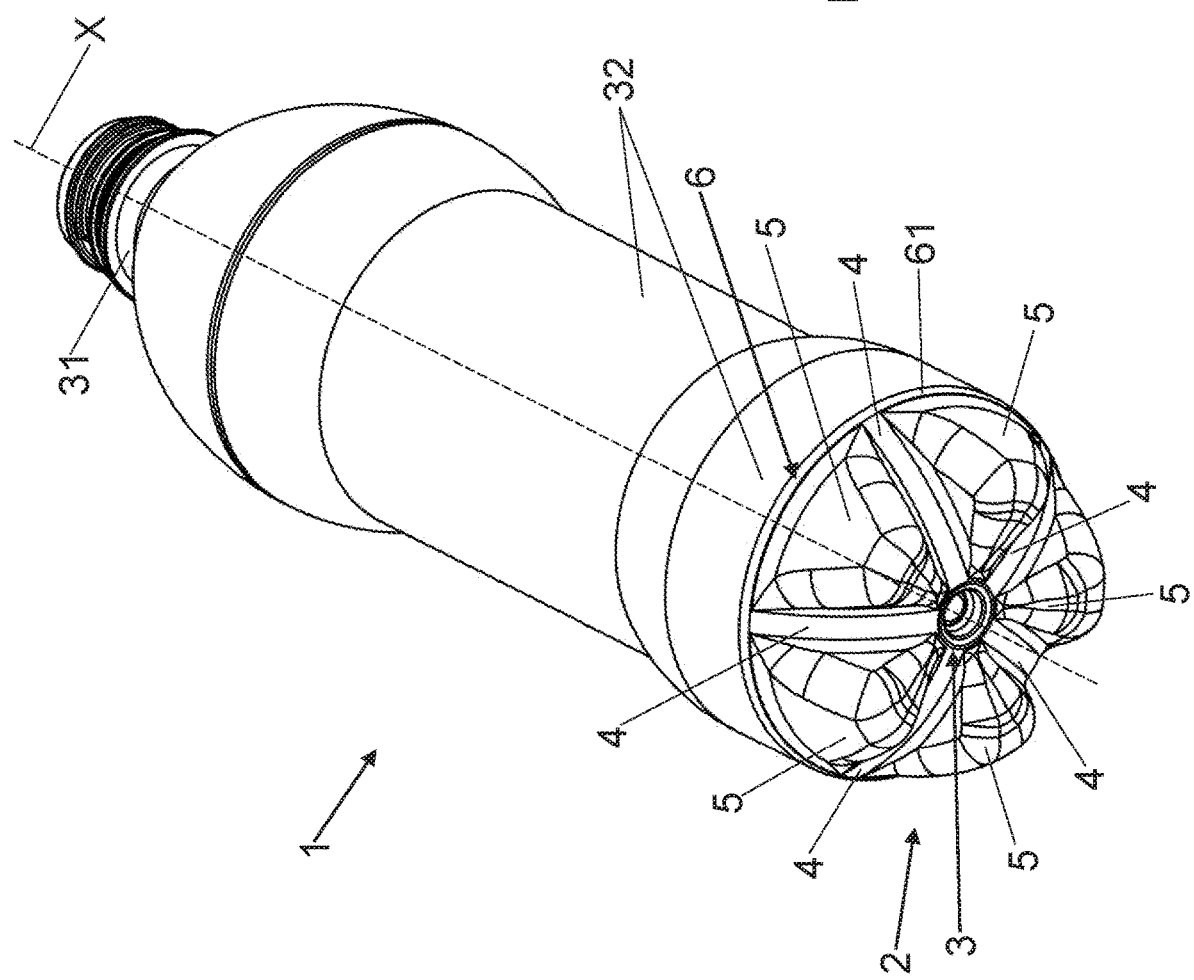
FIG. 1 shows a perspective view of a container according to the invention.

With reference to the figures, a container 1 is described, in particular a bottle, according to the invention.

The container 1 is designed to contain carbonated drinks, for example carbonated soft drinks (CSDs), beer, carbonated water and carbonated energy drinks.

The container 1 is made of thermoplastic material, in particular thermoplastic polymer. Preferably, the container 1 is made of polyethylene terephthalate (PET).

The container 1 is obtained by molding a preform. For example, but not exclusively, the container 1 may be obtained by blow molding or stretch-blow molding a preform.

The container 1 comprises a neck 31, a body 32 and a bottom 2.

The neck 31 defines an opening, and preferably comprises a threaded portion in order to screw a cap. Preferably, the neck 31 also comprises a neck ring, which is used to handle the container 1 during the steps of manufacturing.

The body 32 is hollow and arranged between the neck 31 and the bottom 2. In particular, the body 32 is adjacent to the neck 31 and the bottom 2.

The bottom 2 closes the body 32 and forms a support base so that the container 1 can stand on a surface in a substantially vertical position.

The container 1 defines an axis X, also referred to as a main axis X, passing through the center of the bottom 2. Axis X is preferably the longitudinal axis of the container 1. Preferably, the opening of the neck 31 extends around axis X.

Preferably, the ratio of the weight of the bottom 2 to the overall weight of container 1 is between 0.15 and 0.24, preferably between 0.16 and 0.22.

The overall weight of the container is given by the sum of the weights of the neck 31, the body 32 and the bottom 2.

The bottom 2 is of the petaloid type and comprises feet 5, also referred to as petals, which are arranged in alternating manner with surfaces or walls 4 convex towards the outside of the container 1, also referred to as valleys.

Preferably, there are at least five feet 5. The number of valleys 4 is equal to the number of feet 5.

The feet 5 and valleys 4 preferably extend radially from a central area 3 of the bottom 2.

The feet 5 are preferably completely separated from each other by the valleys 4. The feet 5 protrude towards the outside of the container 1, in particular parallel to axis X, with respect to the valleys 4.

Advantageously, the valleys 4 belong to the same spherical surface having center C (FIG. 5) arranged on the axis X. In other words, the valleys 4 have the same center of curvature C, and a radius of curvature R1 of mutually equal length, and the radius of curvature R1 is constant.

The bottom 2 also comprises an annular rib 6, which is coaxial to axis X.

The annular rib 6 comprises a surface or wall 61 convex towards the outside of the container 1. The radius of curvature of the convex surface 61 can be equal to or less than the radius of curvature R1. When the radius of curvature of the convex surface 61 is equal to the radius of curvature R1, the convex surface 61 also belongs to the same spherical surface as the convex surfaces 4.

Preferably, the outer surface of the annular rib 6 does not include recesses or projections.

Preferably, the annular rib 6 is the portion which defines the maximum diameter of the container 1. The body 32 can have one or more portions having a diameter either equal to or less than the maximum diameter of the annular rib 6.

The annular rib 6 is preferably the uppermost part of the bottom 2. In particular, the annular rib 6 is adjacent to the body 32 of the container 1.

Preferably, the valleys 4 are adjacent, i.e. contiguous, to the annular rib 6. In other words, the valleys 4 are directly in contact with the annular rib 6, and more particularly the upper ends (proximal to the neck 31) of the valleys 4 are directly connected to the annular rib 6.

The feet 5 are adjacent to the annular rib 6. In particular, each foot 5 comprises a surface or wall 7 which is adjacent, i.e. contiguous, to the annular rib 6. The surface 7 is preferably inclined with respect to the annular rib 6, and preferably the surface 7 is concave towards the outside of the container 1, as shown for example in FIGS. 3 and 5. Therefore, there is an inflection point between the concave surface 7 and the convex surface 61.

For each foot 5, a surface or wall 51, preferably being convex towards the outside of the container 1, extends under the surface 7 (see for example FIG. 5). Preferably, the feet 5 are the radially outermost portions of the part of the container 1 under the annular rib 6. In other words, the feet 5 are not surrounded by other parts of the container 1.

Preferably, the annular rib 6 protrudes radially towards the outside with respect to the feet 5, and in particular with respect to the concave surface 7.

Figure 2:
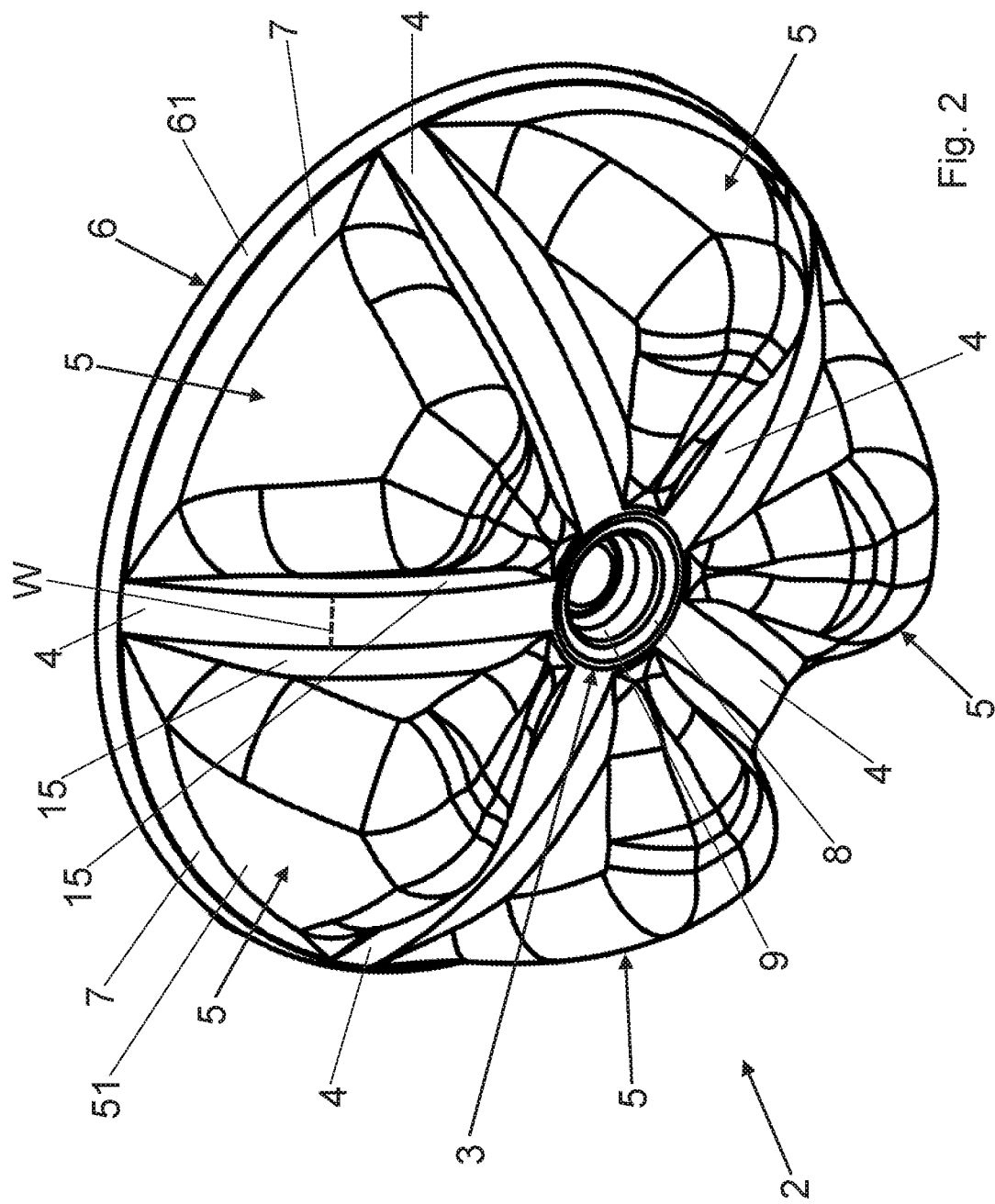
FIG. 2 shows a perspective view of the bottom of the container in FIG. 1.
Figure 3:
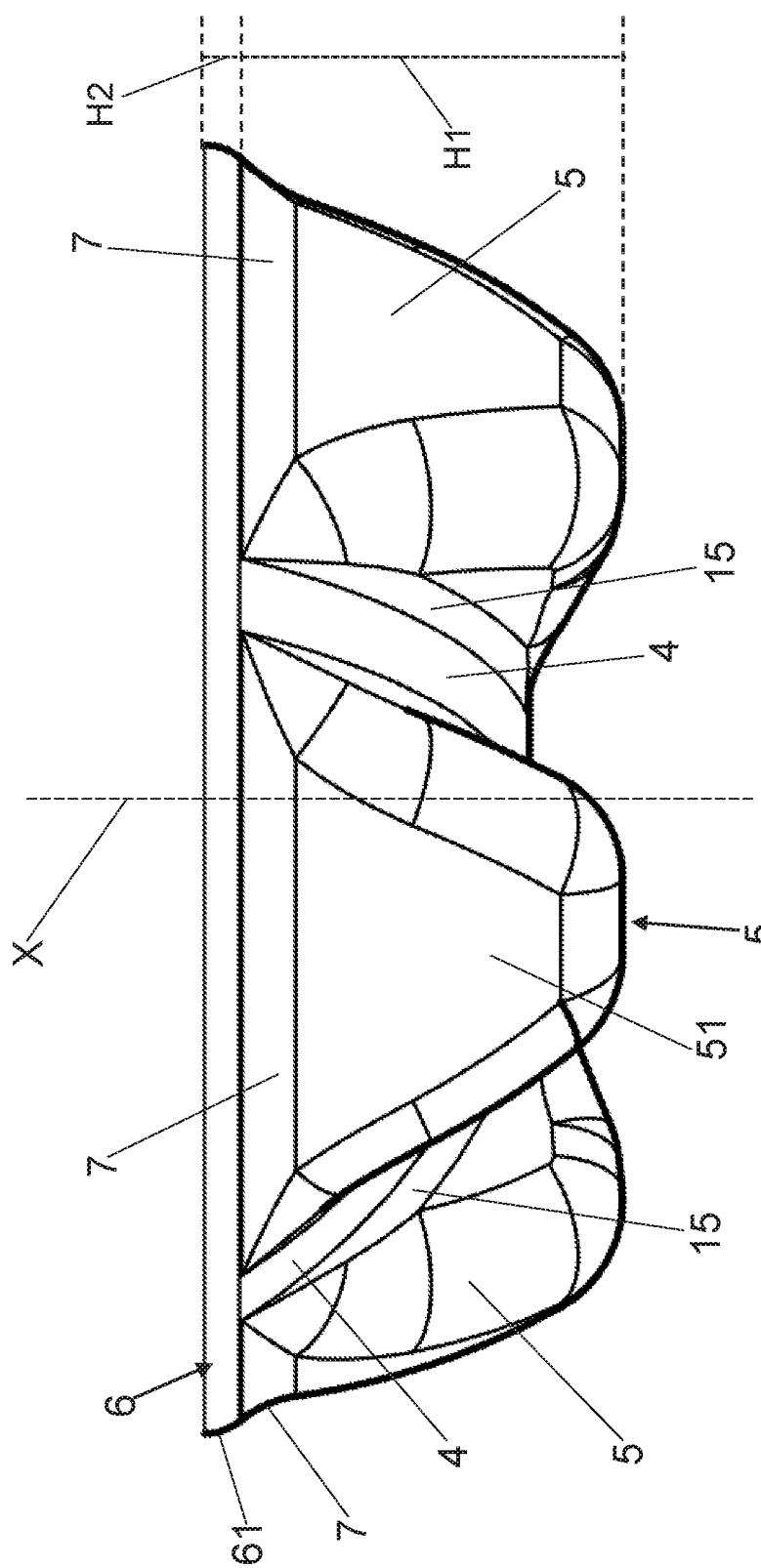
FIG. 3 shows a side view of the bottom in FIG. 2.

The feet 5 also comprise two side surfaces or faces 15 (see for example FIGS. 2, 3 and 4).

A valley 4 is provided between the two side surfaces 15 facing each other. In particular, each valley 4 joins the side surface 15 of a first foot 5 with the side surface 15 of a second foot 5, consecutive to the first foot 5.

Preferably, each valley 4 has a constant width W (FIGS. 2 and 4) from the central area 3 to the annular rib 6.

With particular reference to FIG. 5, the base plane of the container 1, i.e. the support base of the container 1, is indicated by reference "J".

Preferably, the central area 3 of the container 1 comprises an annular edge 8 which delimits a recess 9 of the bottom 2, in particular a recess 9 with respect to the valleys 4. The recess 9 is also referred to as a push-up.

The valleys 4 extend from the annular edge 8. In other words, the valleys 4 are adjacent, i.e. contiguous, to the annular edge 8.

Preferably, the annular edge 8 is defined by an annular surface or wall 81 (FIG. 5A), which is convex towards the outside of the container 1. Preferably, such a convex annular surface 81 has a radius of curvature which is less than the radius of curvature R1 of the valleys 4.

Preferably, the recess 9 has a surface or bottom wall 10 having an annular peripheral portion 11 which is concave towards the outside of the container 1, and a central portion 12 which is convex towards the outside of the container 1, preferably but not exclusively spherical cap-shaped. In particular, the outer surface of the annular peripheral portion 11 is concave towards the outside of the container 1 and the inner surface, opposite to the outer surface of the annular peripheral portion 11, is convex towards the inside of the container 1; and preferably, the outer surface of the central portion 12 is convex towards the outside of the container 1 and the inner surface, opposite to the outer surface of the central portion 12, is concave towards the inside of the container 1.

In particular, the aforesaid bottom wall 10 is distinct from said annular edge 8. The central portion 12 is crossed by the axis X.

The central portion 12 is adjacent, i.e. contiguous, to the annular peripheral portion 11. The peripheral portion 11 surrounds the central portion 12. Preferably, the surface or side wall 13 of the recess 9 is shaped as a truncated cone. The side wall 13 preferably extends between the annular peripheral portion 11 and the annular edge 8.

Typically, but not exclusively, due to the process of manufacturing the preform with which the container 1 is made, a projection or protrusion 14 may be present at the injection point of the preform (FIGS. 5A, 5B). In particular, the protrusion 14 may be present on the outer face or surface of the wall 12, approximately at its center.

FIGS. 5A and 5B show an advantageous aspect of a container 1 according to the invention. FIG. 5A diagrammatically shows a condition in which the pressure inside the container 1 is lower than the pressure inside the container in the condition in FIG. 5B.

In FIGS. 5A and 5B, the plane L is tangent to the convex annular wall 81 and perpendicular to the longitudinal axis X of the container 1. Reference "h" indicates the distance parallel to the longitudinal axis X, between the protrusion 14 and the plane L. Such a distance "h" is variable as a function of the pressure inside the container 1. Preferably, when the pressure inside the container 1 is substantially equal to atmospheric pressure (e.g. as shown in FIG. 5A), the ratio of the distance h to the total height of the container 1, parallel to the longitudinal axis X, is between 0.10 and 0.18, preferably between 0.11 and 0.14.

Typically, but not exclusively, when the pressure inside the container 1 increases, as shown for example in FIG. 5B, the distance between plane L and the protrusion 14 decreases with respect to the condition in FIG. 5A, but maintains a value greater than or equal to 0, preferably greater than 0.

Thereby, the protrusion 14 is advantageously prevented from interfering with the support base J (FIG. 5) of the container 1. This advantageous effect can be seen even when, due to the pressure inside the container 1, there is a deformation of the bottom 2 such that the plane L approaches the base plane J of the container 1, until the plane L and the base plane J are substantially coincident.

Preferably, the feet 5 comprise a respective support area for the container 1. In particular, such a support area is the lower area of the foot 5, on which the container 1 rests when the bottom 2 is arranged on a support surface or base.

Preferably, the feet 5 define the only support areas of the container 1, in particular when in the vertical position.

The support areas of the feet 5 are distributed along a circumference K, indicated by a dotted line in FIG. 4. Such a circumference K defines the base plane J of the container 1 (FIG. 5).

The aforesaid convex surface 51 extends between the support area and the concave surface 7 for each foot 5.

Furthermore, the circumference K has a diameter d1, perpendicular or substantially perpendicular to the axis X. Diameter d1 is also referred to as a standing diameter.

The annular rib 6 defines a diameter d2, which is the maximum diameter of the annular rib 6 and is perpendicular or substantially perpendicular to the axis X. The diameter d2 of the annular rib 6 is greater than the diameter d1 of the circumference K.

In particular, the ratio d1/d2 is preferably between 0.55 and 0.75. With this ratio, a tilting angle of the container 1 between about 10.5° and 11.5° can be obtained. Preferably, the ratio d1/d2 is between about 0.6 and 0.7. With this ratio, a tilting angle of the container 1 between about 10.8° and 11.3° can be obtained.

Each foot 5 has a longitudinal extension H1 (FIG. 3), or height, parallel to axis X. Such a longitudinal extension H1 is the maximum longitudinal extension of each foot 5, starting from the base plane of the container 1, up to the top end of the concave surface 7. In particular, the height of the feet 5 is the distance, parallel to axis X, between the base plane J of the container 1 and the circumference defined by the upper ends of the feet 5, i.e. from the upper ends of the concave surfaces 7.

The annular rib 6 has a height which is parallel to axis X, indicated by reference H2.

Preferably, the ratio H2/H1 is between 0.04 and 0.15, e.g. between 0.05 and 0.12. Preferably, the highest values of the range relate to smaller container formats. Preferably, the ratio of the height of feet 5, expressed in millimeters (mm), to the capacity of container 1, expressed in milliliters (ml), is between 0.025 and 0.055 mm/ml.

In figures from 1 to 7, the annular rib 6 preferably comprises only the convex surface 61.

Alternatively, as shown in FIGS. 8 and 9, the annular rib 6 also comprises a cylindrical surface 62, adjacent to and above the convex surface 61. The cylindrical surface 62 is adjacent to the body 32.

In this variant, the annular rib 6 preferably comprises only the convex surface 61 and the cylindrical surface 62.

The cylindrical surface 62 preferably has a diameter equal to the maximum diameter of the convex surface 61.

The container 1 may advantageously be made in a wide range of formats, in particular with a capacity between 500 ml and 3000 ml.

FIG. 10 shows a mold 102 for molding a container 1 according to the invention. In particular, the mold 102 is configured to mold the bottom 2.

In light of the present description, those skilled in the art can easily determine the features of the molding surface of the mold 102 for forming a container 1, in particular a bottom 2, without or with one or more of the optional features which have been described and/or claimed.

In particular, the molding surface of the mold 2, defines a central axis Z and comprises:

a central area 103, a plurality of concave surfaces 104, which extend from the central area 103, a plurality of recesses 105 arranged alternately with the concave surfaces 104, an annular surface 106, which is coaxial to the central axis Z, wherein the concave surfaces 104 belong to the same spherical surface having the center C arranged on the central axis Z.

Preferably, the concave surfaces 104 are adjacent to the annular surface 106.

The axis Z substantially coincides with the axis X of the blown container 1 arranged in the mold 102.

The central area 103 of the mold 102 is adapted to mold the central area 3 of the bottom 2.

The concave surfaces 104 are adapted to mold the convex surfaces 4, i.e. the valleys.

The recesses 105, which are reentrant with respect to the convex surfaces 104, are adapted to mold the feet 5, i.e. the petals.

The annular surface 106 is adapted to mold the annular rib 6.

Preferably, the annular surface 106 either comprises or is defined by a concave surface 161 adjacent to the concave surfaces 104.

Optionally, the annular surface 106 also comprises a cylindrical surface adjacent to and above the concave surface 161.

Preferably, each recess 105 comprises a surface 107 which is adjacent to the annular surface 106 and inclined with respect thereto. Preferably, the surface 107 is convex.

The ranges of values indicated in the present description preferably, but not exclusively, also comprise the extreme values.

The invention claimed is:

1. A container made of thermoplastic material, defining a longitudinal axis and having a petaloid type bottom, the bottom comprising:
    a central area;
    a plurality of first convex surfaces, convex towards the outside of the container, which extend from the central area;
    a plurality of feet, arranged alternately with the first convex surfaces, and projecting outwards with respect to the first convex surfaces;
    an annular rib, which is coaxial to said longitudinal axis;
    wherein the first convex surfaces belong to the same spherical surface having the center arranged on said longitudinal axis; and
    wherein the central area comprises an annular edge which delimits a recess of the bottom.

2. The container according to claim 1, wherein the first convex surfaces are adjacent to the annular rib.

3. The container according to claim 1, wherein the annular rib comprises a second convex surface, convex towards the outside of the container, adjacent to the first convex surfaces.

4. The container according to claim 3, wherein the annular rib also comprises a cylindrical surface, adjacent to and above said second convex surface.

5. The container according to claim 1, wherein each foot of said plurality of feet comprises a surface which is adjacent to the annular rib and inclined with respect thereto, and wherein said surface is concave towards the outside of the container.

6. The container according to claim 1, wherein the recess has a bottom surface having an annular peripheral portion which is concave towards the outside of the container, and a central portion which is convex towards the outside of the container; and wherein the central portion is adjacent to the annular peripheral portion and/or the annular peripheral portion surrounds the central portion.

7. The container according to claim 6, wherein the first convex surfaces extend from the central area from the annular edge.

8. The container according to claim 5, wherein the annular edge is defined by a surface which is convex towards the outside of the container, having a smaller radius of curvature than the radius of curvature of the first convex surfaces.

9. The container according to claim 1, wherein a width W of each first convex surface is constant from the central area to the annular rib.

10. The container according to claim 1, wherein the feet of said plurality of feet comprise a respective support area for the container;
    wherein the support areas are distributed along a circumference, defining a base plane of the container, and having a first diameter;
    wherein the annular rib defines a second diameter, which is the maximum diameter of the annular rib;
    wherein the second diameter is greater than the first diameter; and
    wherein the ratio of the first diameter to the second diameter is between 0.55 and 0.75.

11. The container according to claim 1, wherein each foot of said plurality of feet has a first longitudinal extension, parallel to the longitudinal axis, from a base plane of the container;
    wherein the annular rib has a second longitudinal extension, parallel to the longitudinal axis; and wherein the ratio of the second longitudinal extension to the first longitudinal extension is between 0.04 and 0.15.

12. The container according to claim 1, wherein the annular rib is the upper part of the bottom, adjacent to the body of the container; and wherein the ratio of the weight of the bottom to the overall weight of the container is between 0.15 and 0.24.

13. The container according to claim 1, wherein the feet of said plurality of feet are the radially outermost portions of the part of the container under the annular rib.

14. A mold configured to mold a container according to claim 1.

15. The container according to claim 10, wherein the ratio of the first diameter to the second diameter is between 0.6 and 0.7.

16. The container according to claim 11, wherein the ratio of the second longitudinal extension to the first longitudinal extension is between 0.05 and 0.12.

17. The container according to claim 12, wherein the ratio of the weight of the bottom to the overall weight of the container is between 0.16 and 0.22.

* * * * *